Aug. 8, 1961
W. HERBERT ET AL
2,995,511
METHOD OF REFINING HYDROCARBONS BOILING BELOW 400° C
Filed Oct. 15, 1958
2 Sheets-Sheet 1
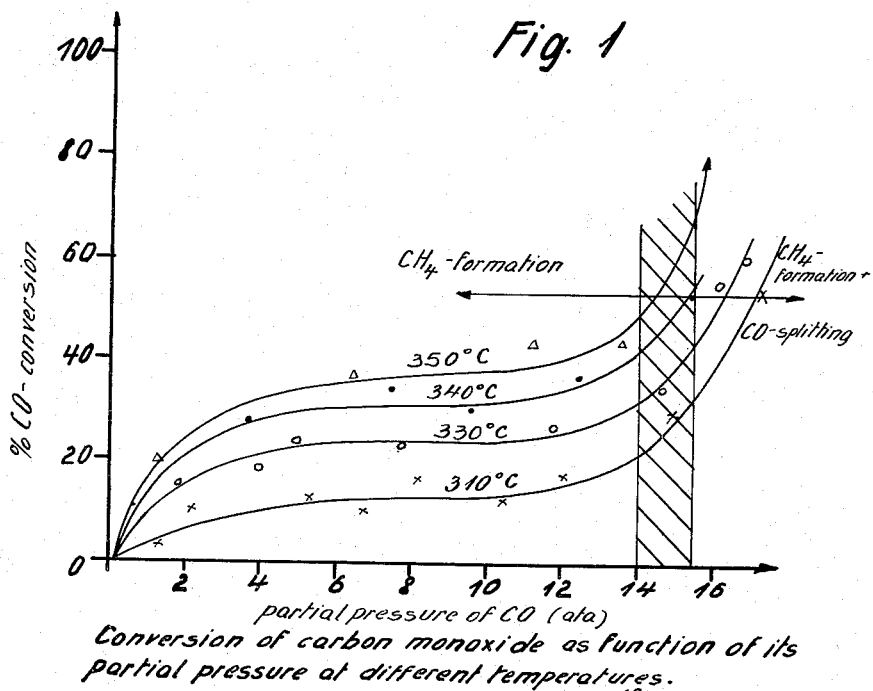
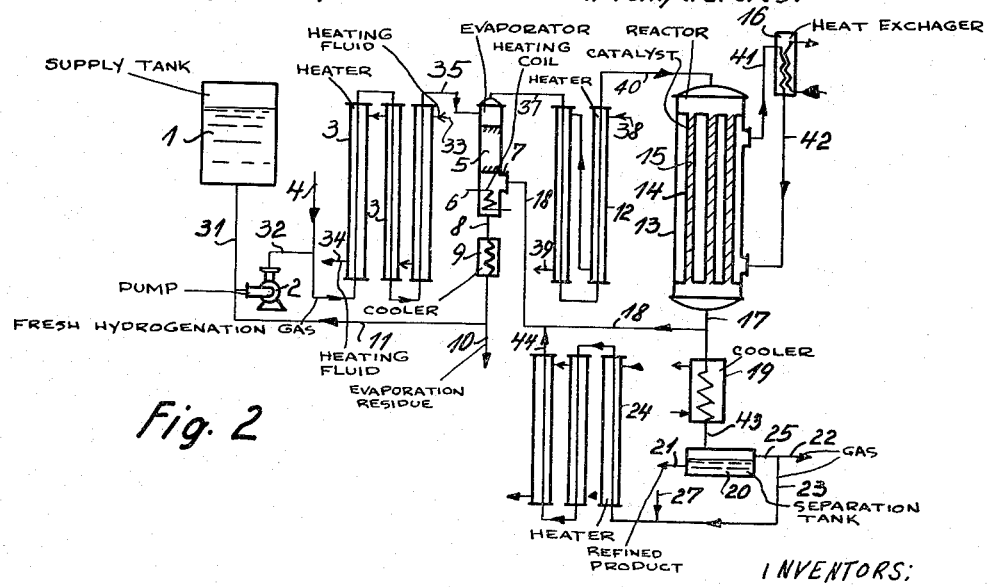
INVENTORS:
WILHELM HERBERT, KARL-HEINZ EISENLOHR, RICHARD BAYER
ATTORNEYS

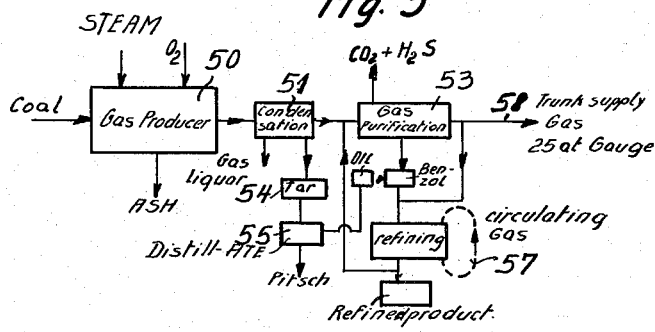
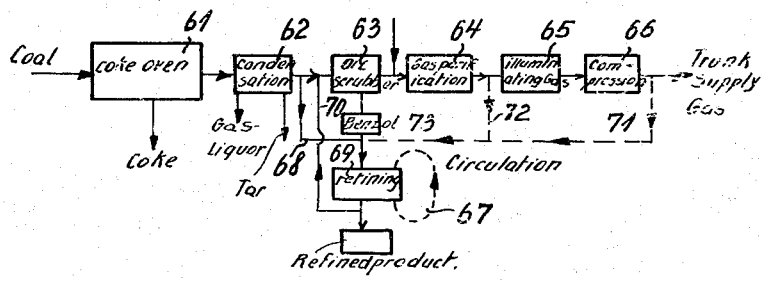
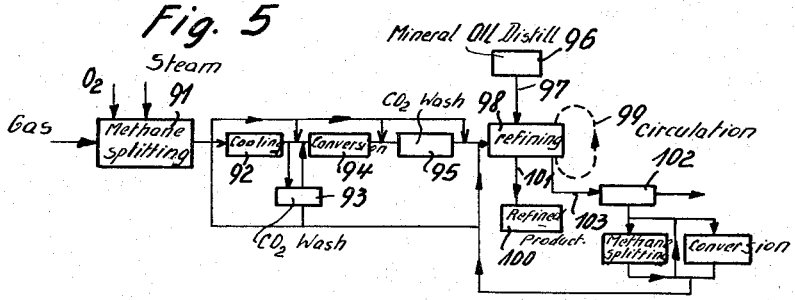

United States Patent Office 2,995,511
Patented Aug. 8, 1961

2,995,511
METHOD OF REFINING HYDROCARBONS BOILING BELOW 400° C.
Wilhelm Herbert and Karl-Heinz Eisenlohr, Frankfurt, and Richard Bayer, Bad Homburg vor der Hohe, Germany, assignors to Metallgesellschaft A.G., a corporation
Filed Oct. 15, 1958, Ser. No. 767,470
Claims priority, application Germany May 21, 1953
13 Claims. (Cl. 208—213)

This invention relates to removal of impurities from hydrocarbon mixtures.

The present application is a continuation-in-part of application Serial No. 431,206, filed May 20, 1954, now abandoned.

In the dry distillation of fuels, for example in the low-temperature carbonization or coking of mineral coals, brown coals, peat, oil shale, and the like; in the gasification of these fuels under normal or elevated pressure of for example 5 to 30 atmospheres or more, with air, air enriched with oxygen, or oxygen and water vapor; in the thermal or catalytic cracking of liquid hydrocarbons, for example petroleum oils or petroleum oil distillates, or of tars or tar mixtures or their distillates; and also in the hydrogenation of solid or liquid fuels or the distillates of fuels, hydrocarbon mixtures are obtained which contain sulfur, nitrogen and oxygen compounds, for example mercaptans, thiophenes, disulfides, amines, pyridines, phenoles, cumerones. Furthermore these hydrocarbon mixtures contain insaturated organic compounds, for example olefines and diolefines. The presence of these impurities usually necessitates considerable expenditure for the separation, polymerization, or decomposition of these impurities.

It is known to treat such mixtures of substances with hydrogen or gases containing hydrogen at temperatures of 400° C. and higher and at high pressures in the gas phase in the presence of sulfur-resisting catalysts, in order to obtain a reaction of the undesired substances with hydrogen. This method, however, necessitates high grade hydrogen, which is produced for example by decomposition of water vapor on iron or from industrial water gas. All methods of producing a high grade hydrogen are expensive, particularly production from water gas or similar gases containing carbon monoxide, from which hydrogen is obtained either by low-temperature decomposition, preceded by separation from sulfide and carbonic acid, or by carbon monoxide conversion preceded by dry purification for the purpose of binding the hydrogen sulfide and followed by a carbonic acid wash and methanization or washing to react or remove the last residues of carbon monoxide, for example with an ammoniacal cuprous chloride solution. By newer methods it is also possible to carry out such processes also at lower pressures, for example 60 atmospheres above atmospheric, when using hydrogen or gases having high hydrogen contents. Instead of hydrogen free from carbon monoxide, or gases having high hydrogen contents free from carbon monoxide, coke oven gas has also been used, working at pressures of 150 atmospheres, in order to balance the reaction-restricting action of the carbon monoxide by a high hydrogen partial pressure on the catalyst. (W. Urban "Erdöl und Kohle," vol. 4, May 1951, pp. 279-282.)

Since in addition to the sulfur, nitrogen and oxygen compounds, resin-forming polymerizable and condensable compounds and also other compounds detrimental to the catalysts occur, these substances have also already been reacted and separated by pre-polymerization with or without catalysts, for example in accordance with German patent specifications 550,123, 630,384, or British patent specifications 345,738 and 424,531.

According to the invention the removal of said impurities form hydrocarbon mixtures, using a hydrogen containing gas which also contains carbon monoxide, can be effected at relatively low temperature and pressure provided certain particular reaction conditions are employed. Thus, sulfur, nitrogen and oxygen compounds and the other impurities can be removed from a condensable hydrocarbon product which has a boiling point below 400° C., e.g. hydrocarbons obtained from the gasifying of solid or liquid carbonaceous fuels, by admixing with the hydrocarbon product a gas containing hydrogen and carbon monoxide. In the hydrogen and carbon monoxide containing gas supplied to the refining process the partial pressure of hydrogen is below 25 atmospheres and the partial pressure of carbon monoxide is between 0.1 and 15 atmospheres and the total partial pressure of the hydrogen and carbon monoxide is not in excess of 40 atmospheres. The reaction temperature on the sulfur-resisting catalyst is between 270° C. and 450° C.

According to the invention, the partial pressure of the carbon monoxide must be below 15 atmospheres as above this partial pressure carbon oxides react with hydrogen to an extent such that the consumption of hydrogen by such reactions is excessive, and, further, free carbon is deposited on the catalyst to an objectionable extent by decomposition of carbon monoxide.

The impurities to be removed from the hydrocarbons can be rendered harmless according to the invention on known sulfur-resisting catalysts, such as the sulfides of tungsten, molybdenum, chromium, nickel, iron, and other sulfides or mixtures thereof, which may also contain activators and/or carrier substances. Examples of suitable catalysts are:

| Catalyst A | Catalyst B | Catalyst C |
|---|---|---|
| 18% molybdic acid. 8% cobalt oxide. 3% graphite. 71% alumina hydrate. | 10% molybdic acid. 90% alumina hydrate. | 10% molybdic acid. 3% cobalt oxide. 87% alumina hydrate. |

The treatment of these raw materials can be carried out for the purpose of splitting up the sulfur, nitrogen and oxygen containing compounds contained therein even at temperatures of 270 to 450° C., particularly at 300 to 350° C., whereby these substances are reduced by the catalytic action of hydrogen into hydrogen sulfide, ammonia, water and hydrocarbons. The unsaturated compounds are hydrogenated to saturated hydrocarbons.

Thus in the presence of carbon monoxide, a hydrogen partial pressure of 25 atmospheres gauge in the fresh hydrogen containing gas is sufficient according to the invention, whereas according to the prior art a hydrogen partial pressure of at least about 75 atmospheres gauge would be required.

The method of the invention is preferably applied in a total pressure range of up to 75 atmospheres gauge, while in the case of gases having a high hydrogen content the operation is carried out with a maximum hydrogen partial pressure of up to 25 atmospheres gauge, preferably of 10 to 18 atmospheres gauge, and in the case of gases having a high carbon monoxide content with a maximum carbon monoxide partial pressure of up to 15 atmospheres gauge, preferably 0.1 to 5 atmospheres gauge, referred to the gas freshly introduced into the process.

The hydrogen-containing gas used may be for example gases which are produced in the dry distillation of mineral coals or brown coals, particularly the high temperature and medium temperature coking of said fuels or in the gasification of solid or liquid carbonaceous fuels as coke, mineral, coals, brown coal, peat, oil shale, petroleum, tar, or distillation residues of liquid fuels, with air, air enriched with oxygen, oxygen and water vapor and/or carbon dioxide, while the gasification can take place under normal pressure or higher pressure. Other hydrogen-containing gases can also be used, for example those which are produced in the splitting of methane with water vapor and/or oxygen. The combination of the process of the present invention with gasification methods working under pressure has been found particularly advantageous, because the gases produced by these gasification methods can be used directly, and if desired without compression and purification for the removal of the impurities of the hydrocarbons. In some cases previous separation of high-boiling constituents and possibly water and some carbon monoxide from the gases before they are used according to the present invention is advantageous. It is also often advisable previously to remove more or less thoroughly the carbon dioxide contained in the gases. For example, carbon dioxide, which acts as a ballast substance, can be separated by known measures, conveniently to residual contents of below 5%, for example down to 3%. Gases produced under normal pressure from the gasification of fuels and the like also have considerable advantages, because in this case also purification or intensive purification of the gases need be effected only to the extent required for compression.

The process of the present invention is applicable to all mixtures, boiling below about 400° C., which can be evaporated at the working pressure in the presence of carrier gases, of the starting materials designated in the introductory remarks. A high-grade refined product having minimum resin contents is obtained in a form practically free from sulfur and nitrogen by the catalytic treatment according to the present invention after removal of the hydrogen sulfide and/or ammonia formed through the reactions on the sulfur-resisting catalysts and dissolved in small amounts in the refined product, for example by treatment with dilute caustic soda solution and/or dilute sulfuric acide and/or by further distillation or stabilization, i.e. without treatment with concentrated sulfuric acid. The refined products are suitable not only for motor fuel purposes but are also excellently suited for the production of pure aromatic substances, for example benzene, toluene, or isomeric xylolene, for example by distillation, azeotropic distillation, extractive distillation, or extraction.

For refining in the vapor phase the starting substances are heated and after mixing with the refining gas evaporated. This evaporation yields a residue which is drawn off, while the vapors and gases are supplied to the catalyst.

In heat exchangers, which are advantageously disposed vertically the hydrocarbons and the refining gas are heated in counter-current stream to reaction temperature by the hot mixture of gas and refined products leaving the reactor. The heating can however also be effected in other manners, for example in tubular coils which are directly heated by electric current.

The vapor mixture which is composed of the fresh gas, to which recycled gas may be added, and the evaporated starting substances, is now passed to the catalyst, if necessary after further heating to the working temperature. The catalyst can either be disposed between cooling elements in such manner that detrimental overheating through the reaction heat produced is avoided. Generally the catalyst is placed in a reactor tube in one or more layers. The catalyst cross-sections and the length of the flow path are so selected that a turbulent gas flow prevails in the catalyst space. The rate of contacting can be between 300 and 3,000, preferably 600–1,500 cubic meters of gas (calculated at 0° C. and 760 mm. Hg) per cubic meter of catalyst per hour.

The gas-vapor mixture leaving the catalyst space is cooled in order to separate the refined product, whereupon a part of the gas is returned to a point before the reaction chamber, for example to the evaporation stage, preferably after heating by heat exchange.

In the case of starting substances having a low sulfur content, sulfur-containing substances such as $H_2S$, $CS_2$, etc., may be added, for example in order to keep the catalyst in the sulfidized condition.

According to the invention, recycling may be dispensed or the amount of gas recycled may be correspondingly reduced, if a sufficiently large amount of fresh gas is used instead.

When a refining plant according to the present invention is coupled to a town gas production plant, the crude town gas is used as refining gas, if desired after compression and if desired after washing out the carbonic acid and/or ammonia and/or hydrocyanic acid. The gas fraction withdrawn from the refinery plant can for example be re-added to the gas produced in the gas production plant, preferably before the benzol production plant.

In the case of coke-oven gas, preferably the purified gas is used and the tail gas of the refining plant is returned to the unpurified coke-oven gas.

As stated hereinbefore, the necessary condition of the method of the invention is that in the freshly introduced hydrogen containing gas (fresh gas) the partial pressure of hydrogen is below 25 atmospheres, of carbon monoxide less than 15 atmospheres and the total partial pressure of hydrogen and carbon monoxide is not in excess of 40 atmospheres. The reason for these limitations is the following:

When a hydrocarbon such as is purified according to the present invention is treated in the presence of a sulfur-resistant catalyst and additionally in the presence of a hydrogen and carbon monoxide gas, the following reactions of the carbon monoxide take place:

(1) Methanization of the carbon monoxide

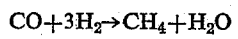

(2) splitting of the carbon monoxide

(3) methanization of the carbon dioxide

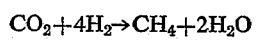

All these reactions are dependent on the temperature and especially on the partial pressure of the carbon monoxide.

This is demonstrated most clearly in the graphic illustration of FIGURE 1, wherein the results of experiments according to Example 4 which were effected employing gases with different carbon monoxide contents are shown. In the graph the ordinate axis represents the CO transformation in percent and the abscissa the partial pressure of the carbon monoxide.

Thus it can be seen that the increased $CH_4$ formation from the CO, which occurs with the higher partial pressures, especially above 15 atmospheres, and from the carbon monoxide splitting, consumes a great amount of hydrogen, so that the hydrogen available for the refining is no longer sufficient for adequate removal of the impurities, i.e., sulfur, nitrogen compounds.

From FIGURE 1 it can be seen:

(1) That the CO transformation is very small at CO-partial pressures of less than 15 atmospheres but above a CO-partial pressure of 15 atmospheres the CO-conversion increases very rapidly. The influence of the temperature on the CO conversion is relatively not so great as the influence of the partial pressure of the CO;

(2) That under carbon monoxide partial pressures of less than 15 atmospheres, only the conversion of the carbon monoxide into methane and no appreciable splitting of the carbon monoxide and no depositing of black carbon on the catalyst take place;

(3) That under increasing carbon monoxide partial pressures an increased splitting of the carbon monoxide to carbon and carbon dioxide occurs. At the same time, the methanization of the carbon monoxide and carbon dioxide increases. This can be seen from the following reaction equations:

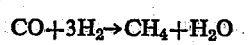

and $$CO_2 + 4H_2 \rightarrow CH_4 + 2H_2O$$

since in both reactions a decrease of the mol number occurs, i.e., the equilibrium is shifted in favor of the reaction products with increasing pressure;

(4) That with the splitting of the carbon monoxide, carbon in its finely divided form is deposited on the catalyst, thereby markedly decreasing the hydrogenation activity of the catalyst, necessitating frequent regeneration thereof.

When refining hydrocarbon mixtures containing a high amount of the above mentioned impurities especially unsaturated compounds high reaction heat results. In this case it is necessary to avoid an increasing of the reaction temperature over the catalyst layer above a certain point. The maximum allowable temperature at the catalyst depends on the raw material to be refined and the desired quality of the final product. The temperature at the catalyst never should increase above 450° C.

To keep the temperature at the desired lower level cooling gas is introduced between the catalyst layers at one or several points. Preferably the fresh gas according to the invention is used on said cooling gas while the recycled gas in mixture with the hydrocarbon vapors enters the top of the reactor. If the fresh gas is not sufficient for cooling a part of the recycled gas may be introduced with the fresh gas between the catalyst layers. A further advantage of this embodiment of the invention is the possibility of using hydrogen containing gases which contain oxygen and nitrogen oxide which substances cause polymerization of olefines and diolefines of the hydrocarbon mixtures in the preheater and evaporator.

The invention will be explained with reference to the accompanying drawings in which apparatus for carrying out the new process is illustrated by way of example and diagrammatically.

FIGURE 2 is a flow sheet depicting a purification according to the invention;

FIGURE 3 is a flow sheet depicting purification according to the invention in which the hydrocarbon purified and the hydrogen and carbon monoxide containing gas used for the purification are each derived from a fuel subjected to gasification, and the purification and gasification are carried out at substantially the same pressure;

FIGURE 4 is a flow sheet depicting a purification similar to that shown in FIG. 3 except the purification and gasification are carried out at different pressures;

FIGURE 5 is a flow sheet depicting purification according to the invention in combination with a methane splitting plant.

In the embodiment illustrated in FIGURE 2, the starting materials to be refined are taken from the tank 1 and passed by means of the pump 2 through the pipes 31, 32 to the heater 3, while the fresh gas needed for carrying out the process is admixed from the supply pipe 4. The heater 3 is heated in known manner, for example with oil, preferably in counter-current to the material to be heated, the oil entering the heating system of the heater at 33 and leaving at 34. The mixture of fresh gas and raw product is brought in the heater 3 to the temperature required for evaporation in the evaporator 5 following said heater, or is heated to a higher temperature, for example to the reaction temperature. From the heater 3 the mixture of vaporous, gaseous and liquid substances passes through the supply pipe 35 into the evaporator 5, which is advantageously provided with filling material, inserts or similar material, and which can be heated directly in known manner, for example by means of the heating coil 6 or the like. With the aid of heated gas passing in counter-current and entering at 7, for example fresh gas and/or recycled gas which for example has been heated by heat exchange with the reaction products and/or in any other manner, the evaporation fractions are separated in the evaporator 5 from the resins, asphalts and similar substances existing in the starting materials and formed in the course of the heating. About 1 to 10% of the materials introduced into the evaporator is drawn off in liquid form through the outlet 8, and can be cooled in the cooler 9 and removed from the system through the outlet 10. A part of the evaporation residue may be returned to the raw product through the pipe 11. The evaporation residue drawn off at 10 is advantageously split up by distillation at normal pressure or reduced pressure into a pitch-like residue and a distillate which can be returned to the process.

The vapors mixed with fresh gas or with fresh gas and recycled gas leave the evaporator 5 through the pipe 37 and are heated in the heater 12 to the reaction temperature or slightly higher. The heating can be effected for example by means of hot oil, for example by means of dowtherm or by means of gas heating. The heating medium can for example be introduced at 38 and discharged at 39; or the heating can be carried out in other known manners, for example by means of electric resistance heating.

The mixture of gases and vapors brought to the necessary temperature in the heater 12 passes through the pipe 40 upwards into the reactor 13, in the contact tubes 14 of which the catalyst 15 is disposed. As the gas-vapor mixture passes through the catalyst, decomposition of the sulfur and nitrogen compounds takes place. The heat of reaction thereby liberated is absorbed by a high boiling point or the like surrounding the contact tubes, and said oil or the like gives up the absorbed heat of reaction in the heat exchanger 16, for example with the generation of steam. The oil is preferably recycled through the reactor 13 and heat exchanger 16, for which purpose the pipes 41 and 42 are provided. Through the outlet 17 gas and refined product vapors leave the reactor 13. Part of the hot mixture can be returned through the pipe 18 to the evaporator 5, which it enters at 7. The remainder flows into the cooler 19 and is cooled therein, whereby the refined product is liquefied. The separation of liquid substances and substances which have remained in the gaseous state is effected in the tank 20, which is connected by the pipe 43 to the cooler 19. The refined product is withdrawn from the tank 20 at 21 and can be washed in known manner by dilute lyes and acid in order to remove hydrogen sulfide and ammonia. A water wash and redistillation preferably follow.

A part of the gas, aliquot to the fresh gas, is branched off from the installation, for example through the pipe 22. From this partial stream, low-boiling refined product fractions can be produced in known manner, particularly when working at normal pressure or low pressures. The remaining gas fraction, which for example may contain a high percentage of methane and homologues of methane, can be worked up in known manner, for example by low temperature decomposition, methane splitting, or the like methods, after which all or part of the gas resulting from this working up is preferably returned to the refining plant.

A part of the gases and vapors can be returned from the tank 20 through the pipes 22, 23 and the heater 24, which can also be constructed as a heat exchanger, to the evaporator 5, for example through the pipes 44 and 18. An installation of known construction for separating recovering low-boiling refined product fractions can be provided at 25 behind the separator 20. In these cases it is possible to dispense with the return of the gas-vapor mixture from the reactor 13 through the pipe 18 to the evaporator 5, or the amount of the gas returned can be substantially reduced.

If no or only little recycled gas is used, fresh gas is advantageously introduced at 27 and can then be heated in 24, advantageously by heat exchange with the gases leaving the reactor 13 and if desired in an additional heater.

From the gas fraction leaving the plant at 22, hydrogen sulfide can be separated or recovered, if required in any desired manner, including washing, for example with the starting substances, in order if desired to be re-added to the starting materials, for example the fresh gas, in the case of the treatment of starting substances having a low sulfur content, in order to maintain a sulfur concentration necessary for the activity of the catalyst. Regulation of the composition of the recycled gas in respect of its hydrogen and carbon monoxide content is preferably effected by supplying the requisite quantity of fresh gas.

The combination of a pressure gasification plant with a refining plant according to the invention as illustrated in FIGURE 3 includes a gas generator 50. The latter works in known manner approximately as described in German patent specifications 606,948, 591,008 and 576,134. For example, mineral coal or brown coal is gasified therein with the introduction of water vapor and oxygen or air enriched with oxygen at a pressure of for example 25 atmospheres gauge. The gasification residues are discharged in known manner. Gas, water and tar are separated, as known per se, in the condensation plant 51, from the gas produced. The remaining gas now still contains benzene and oil fractions which can be separated for example in known manner in an oil wash. The gas can then for example be further treated in a pressure water wash in which $CO_2$ and $H_2S$ are separated from the gas by the usual means. However, as diagramatically illustrated in FIGURE 3, it can also be purified to town gas purity in a low-temperature wash 53 in which it is washed with an organic washing agent, for example with methanol.

The lighter fractions are preferably distilled off from the tar collected in the apparatus 54 and together with the benzene fractions originating from the oil or low-temperature wash are worked up according to the invention in the plant 56. The refinement of the product is effected with purified gas produced in the gas generator 50, preferably at approximately the pressure of production. The catalyst used contained molybdenum sulphide, which was deposited on alumina as carrier. A part of the gas coming from the refining plant can be returned to the plant 56 in the recycle circuit 57. The gas fraction separated from the process is passed for example to a town gas pipe line or is advantageously returned at a suitable point to the production or refining plant.

The amount of gas taken from the gas generation plant for the refining of the raw product, when treating the fractions boiling up to 320° C. and without recycling, amounts to about 5% of the gas produced, which can be used with particular advantage as town gas and for that purpose is taken off through the pipe 58.

When a refining plant according to the invention is incorporated in a gas works or coke works (FIGURE 4), the gas formed in the high temperature coking plant 61 is first freed from tar, dust and water in a condensation plant 62. It is then washed with oil in order to recover the benzene hydrocarbons in the apparatus 63, and is thereupon available, after treatment with an iron oxide mass in the gas purifier 64, as coal gas in the gasometer 65. Before the dry purification, water gas, natural gas, or another gas can be added in order to regulate the calorific value.

After the gaseous purification the coal gas can be brought to town pressure in the compressor plant 66.

The gas required for refining benzene is taken for example through the pipe 68 between the condensation and the oil wash, which may also be preceded by an ammonia wash, and is passed to the benzene refining plant 69 preferably after compression. Said plant can likewise be provided with gas recycling means 67.

The gas separated from the refining plant 69 or the separated gas fraction is preferably returned to the main stream before the oil wash, for example through the pipe 70.

The refining can however also be effected with the coal gas or town gas, which then arrives through the pipes 71, 72 and 73, while the gas removed from the refining plant, or the gas fraction removed, is likewise advantageously returned to the main stream before the oil wash.

In the embodiment illustrated in FIGURE 5, a gas having a high methane content is split in known manner on catalysts, preferably under pressure, for example in the presence of oxygen and water vapor. The crack gas can now be passed direct to the refining plant, for example in the hottest possible condition, if desired after separation of the water vapor or a part thereof; or the crack gas can also be passed, if desired in the hottest possible condition, to a conversion plant in which carbon monoxide is reacted with water vapor to form hydrogen.

For example, the crack gas coming from 91 is cooled in the cooler 92, the carbonic acid is then removed in the washer 93, the carbon monoxide is converted in 94, and carbonic acid formed by the conversion is washed out with water in 95.

It is however also possible to dispense optionally with one or the other of these processes, whereby the composition of the refining gas can be adjusted as desired in respect of carbon monoxide and hydrogen.

The gas produced in this manner can then be used for refining hydrocarbons and hydrocarbon fractions, for example tar or petroleum fractions, which enter the refining plant through the pipe 97 from the storage tank 96. The refining plant can, as described, be operated with gas recycling 99. The refined product is collected in the tank 100, which is connected by the pipe 101 to the refining plant.

The gases, or a part of the gases, which leave the refining plant can first be treated to recover valuable substances contained in them, for example ethylene, $C_3$ and $C_4$ hydrocarbons, and the like, in known manner, for example in the apparatus 102, which they enter through the pipe 103. After this treatment, or else directly on leaving the refining plant, the gases can for example be passed to a methane splitting plant and/or a conversion plant, in order to obtain a gas rich in hydrogen, which can be utilised in the process itself. Methane splitting is for example preferred when a gas rich in methane is obtained from the refining plant. In the case of substantial carbon dioxide contents, removing may be advantageous.

The processes illustrated in FIGURES 3 to 5, which are described above, can also be applied when the decomposition of the sulfur, nitrogen and oxygen compounds which are contained in the liquid products to be worked up and coming from the dry distillation of fuels, the gasification or hydrogenation of fuels, or the like, or their distillates, is carried out by other methods than that of the invention.

Particularly suitable catalysts for the process of the invention are the sulfur-resisting oxides and/or sulfides of the elements of the sixth group of the periodic system, to which in addition, in order to improve activity, oxides and/or sulfides of the elements of the eighth group of the periodic system, for example nickel oxide or sulfide and/or iron oxide or sulfide, can be added. The oxides mentioned can in likewise known manner be mixed with oxides and/or hydroxides and/or sulfides of other metals, for example zinc, magnesium, aluminum, or the like. The catalysts can be produced in known manner by precipitation, mixing, evaporation of solutions, sintering, and like methods.

*Example 1*

600 kg. per hour of crude spirit separated from the gas of the pressure gasification of mineral coal boiling between 45 and 205° C. which contains 0.8% by weight of sulfur and 0.3% of nitrogen is heated to 250° C. in the heater 3 at 25 atmospheres gauge pressure with 150 normal cubic metres per hour of gas containing 95% of $H_2$ and 0.5% CO and 4.5% $N_2$, and at that temperature enters the evaporator 5 at the top. This composition of fresh gas at a pressure of 25 atmospheres gives a hydrogen partial pressure of 23.75 atmospheres and a partial pressures of carbon monoxide of 0.12 atmosphere. About 1200 normal cubic metres per hour of recycled gas preheated to about 300° C. and containing about 60% of hydrogen and further hydrocarbons, preferably methane, nitrogen and carbon monoxide is introduced at the bottom of the evaporator. The reaction pressure here likewise amounts to 25 atmospheres. About 550 kg. of the crude spirit introduced are evaporated, while in the sump of the evaporator a mixture of 50 kg. of non-evaporated hydrocarbons is collected, which contain in a dissolved form 10 kg. of tar-like compounds formed by polymerization. These 50 kg. are run off from the apparatus and separated in a distilling vessel into a distillate of about 40 kg. of lower boiling hydrocarbons, which are returned to the process, and 10 kg. of a tar-like residue. The residue is removed from the vessel and added to the tar produced at the same time by the gasification (or carbonization).

The gaseous mixture of refining gas and evaporated hydrocarbons is further heated to the reaction temperature which is this case amounts to 340° C., and passed through the catalyst layers in the reactor 13. The catalyst consists of 10% molybdic acid supported by alumina hydrate. Passing the catalyst the temperature of the gas-vapor-mixture increases up to 385° C. After the refining the mixture is cooled to about 25° C. After reaction and cooling, 1300 normal cubic metres per hour of gas are separated from the liquid. About 20 to 30 normal cubic metres per hour are dissolved in the liquid product. A further 70–80 normal cubic metres per hour of gas having a hydrogen content of about 50% are run off from the circuit, and the remainder is recycled by means of the gas circulating pump 2.

The refined product separated from the gas, amounting to about 580 kgs., is run off from the pressure apparatus, and by this depressurating about 20 to 30 normal cubic metres per hour of dissolved gas are liberated. A part of this gas may be returned to the process after compression, together with the fresh hydrogen containing gas.

The degasified product is successively washed with dilute caustic soda solution and dilute sulfuric acid, for example of 10% strength, and then re-distilled and stabilized. The resulting gasoline has an octane number of 88 to 92. The phenol content, which in the starting product amounted to about 5% by volume, had receded to below 0.1% after hydrogenation. The final product, treated with caustic alkali solution and redistilled, is completely free of phenol and has a pleasant odor, is free from sulfur and nitrogen compounds, and has a gum test of below 10 mg. per 100 cc.

*Example 2*

A cokeworks benzene with the boiling range of 78–210° C. having a sulfur content of 0.3% by weight and a nitrogen content of 0.1% by weight was treated with coke-oven gas, for which purpose 200 normal cubic metres of coke-oven gas per hour as fresh gas was used per 600 kg. per hour of benzene. This fresh gas contained 45% $H_2$ and 7.8% CO, this means a partial pressure of hydrogen of 19 atmospheres and of carbon monoxide of 2.7 atmospheres. The reaction pressure amounted to 35 atmospheres, the temperature on the catalyst was 340° C., and the amount of recycled gas was 1000 normal cubic metres per hour. The used catalyst was the above mentioned catalyst A. The same yields as in Example 1 were obtained, and a motor benzene of good quality was produced. The excess coke-oven gas was returned to the coke-oven gas production, namely before the gas purification.

*Example 3*

The same crude spirit in the same amount as in Example 1 was treated under the same conditions as in Example 1, but instead of hydrogen with 450 normal cubic metres per hour of pressure gasification gas were used, this gas having been produced in the pressure gasification of mineral coal with oxygen and water vapor at a pressure of 27 atmospheres gauge. The crude spirit had been separated from the pressure gasification gas by an oil wash. In addition to the liquefiable constituents and the crude spirit, carbon dioxide had been separated from the pressure gasification gas to a residual content of 2–2½%. The pressure gasification gas freshly introduced for the refining contained 58% $H_2$ and 26.5% CO. As the reaction pressure amounted 25 atmospheres the partial pressure of hydrogen was 14.5 atmospheres and of carbon monoxide 6.6 atmospheres. The used catalyst was catalyst A. The reaction temperature was 380° C. The yield and the quality of the purified benzene were practically the same as indicated in Example 1. The excess pressure gasification gas, amounting to 350 normal cubic metres per hour, were returned to the pressure gas purification stage.

To demonstrate the influence of the partial pressures on the refining process, the following experiments were carried out:

*Example 4*

Raw benzol boiling between 78 and 204° C. was refined with town gas. The reaction pressure and temperature employed were 51 atmospheres and 350° C., respectively.

The gasification gas before and after the reaction had the following composition:

|  | Starting gas, vol. percent | Final gas, vol. percent |
| --- | --- | --- |
| $CO_2$ | 3.5 | 4.2 |
| $C_nH_m$ | 2.5 | 0.2 |
| $O_2$ | 0 | 0 |
| CO | 12.3 | 10.6 |
| $H_2$ | 48.4 | 38.0 |
| $CH_4$ | 19.9 | 29.6 |
| $N_2$ | 13.4 | 17.4 |

The total CO transformation amounted to 36.7% of the CO content of the starting gas. A splitting of the carbon monoxide was not observed, only the methane formation occurred. The CO partial pressure in the fresh gas amounted to 6.3 atmospheres, the hydrogen partial pressure to 24.7 atmospheres. The used catalyst was catalyst C. The final benzene product showed a total sulphur content of below 0.002% by weight, the bromine number amounted to 52 mg./100 g. and the gum test showed only 3 mg./100 ml.

*Example 5*

The same raw benzol as in Example 4 was treated with a gas from the gasification of coal at a temperature of 350° C., a pressure of 86 atmospheres, and a CO-partial pressure of 16 atmospheres and a hydrogen partial pressure of 48 atmospheres and with the same catalyst C.

The gasification gas before and after the reaction had the following composition:

|  | Starting gas, vol. percent | Final gas, vol. percent |
| --- | --- | --- |
| $CO_2$ | 3.0 | 12.1 |
| $C_nH_m$ | 0.4 | 0.3 |
| $O_2$ | 0 | 0 |
| CO | 18.8 | 7.8 |
| $H_2$ | 55.9 | 20.7 |
| $CH_4$ | 19.6 | 54.5 |
| $N_2$ | 2.2 | 4.6 |

The carbon monoxide was transformed by 80.2%, of which 34.5% was used for the formation of methane and 45.7% for the CO splitting. The $CO_2$ formed was transformed into methane by 59.2%. In the methanization of the CO and $CO_2$, 71.7% of the hydrogen available was utilized. The refining itself only consumed 32 N m.³/t. The refined final product did not meet the requirements, since the methanization has a greater reaction speed and the hydrogen partial pressure occurring at the contact was not sufficient for sufficient purification of the hydrocarbons. The gum test showed with 37 mg./100 ml. a value too high, to use this refined product as motor gas.

The Examples 4 and 5 show very clear that by exceeding the limitation of CO-partial pressure according to the invention also with high hydrogen partial pressure it is not possible to obtain a high grade refined product. The reason for this is that the active surface of the catalyst is first used for the conversion of CO to methane with a high consumption of hydrogen for this reaction. Therefore a much bigger amount of fresh gas is necessary to introduce enough hydrogen into the process, because the methane is not useful in this process.

What we claim is:

1. In the method for removing sulphur and nitrogen impurities from condensable hydrocarbon products having a boiling point below 400 degrees C., such as are obtained from the gasification of carbonaceous fuels, in which the hydrocarbon product is contacted with a hydrogenation gas in the presence of a sulfur resistant catalyst, the improvement to permit the use of a hydrogen-carbon monoxide mixture as the hydrogenation gas which comprises effecting the contacting at a temperature between about 270 and 450 degrees C. with a hydrogenation gas comprising a mixture of hydrogen and carbon monoxide at a hydrogen partial pressure of between about 10 and 25 atmospheres and a carbon monoxide partial pressure between about 0.1 and 15 atmospheres.

2. Improvement according to claim 1 in which said contacting is effected at a carbon monoxide partial pressure between about 1–15 atmospheres.

3. Improvement according to claim 2 in which said contacting is effected at a hydrogen partial pressure between about 10–18 atmospheres.

4. Improvement according to claim 1 including removal of the hydrogenation gas after said contacting, cooling the same and separating the liquified hydrocarbons and thereafter recycling the gas to said contacting as a portion of said hydrogen carbon monoxide-containing hydrogenation gas.

5. Improvement according to claim 1 in which said contacting is effected at a temperature between about 270–330 degrees C.

6. Improvement according to claim 1 in which said contacting is effected with an amount of hydrogenation gas, calculated at 0 degrees C., 760 mm. Hg, of between 300 and 3,000 cubic meters of gas per cubic meter of catalyst per hour.

7. Improvement according to claim 1 in which said contacting is effected with an amount of gas calculated at 0 degrees C., 760 mm. Hg, of between 600 and 1500 cubic meters of gas per cubic meter of catalyst per hour.

8. Improvement according to claim 1 in which said carbon monoxide hydrogen-containing hydrogenation gas is a gas obtained from the gasification of solid carbonaceous fuels.

9. Improvement according to claim 1 in which said carbon monoxide hydrogen-containing hydrogenation gas is a gas obtained from the gasification of liquid carbonaceous fuels.

10. Improvement according to claim 1 in which said hydrocarbon product and said hydrogen carbon monoxide containing hydrogenation gas are each derived from the coking of a carbonaceous fuel.

11. Improvement according to claim 1 in which said hydrocarbon products and said hydrogen carbon monoxide-containing hydrogenation gas are each derived by the gasification of a fuel.

12. Improvement according to claim 11 in which said contacting and said gasification are effected at substantially the same pressure.

13. Improvement according to claim 1 in which said contacting is effected with said catalyst supported in several layers and which includes introducing fresh hydrogen carbon monoxide-containing hydrogenation gas between said catalyst layers.

References Cited in the file of this patent

UNITED STATES PATENTS

| | | |
|---|---|---|
| 2,393,288 | Byrns | Jan 22, 1946 |
| 2,440,673 | Jones | May 4, 1948 |